United States Patent [19]

Tekkanat et al.

[11] Patent Number: 5,280,066
[45] Date of Patent: Jan. 18, 1994

[54] POLYESTER-POLYOLEFIN BLENDS CONTAINING A FUNCTIONALIZED ELASTOMER

[75] Inventors: Bora Tekkanat, Milwaukee; Bryan L. McKinney, Mequon; Helmuth Faust, Brookfield, all of Wis.

[73] Assignee: Globe-Union Inc., Milwaukee, Wis.

[21] Appl. No.: 763,659

[22] Filed: Sep. 18, 1991

[51] Int. Cl.⁵ .................. C08L 23/12; C08L 67/02
[52] U.S. Cl. ............................ 525/64; 525/92; 525/166
[58] Field of Search ..................... 525/64, 166, 92

[56] References Cited

U.S. PATENT DOCUMENTS

| | | | |
|---|---|---|---|
| 4,485,204 | 11/1984 | Nabors | 524/430 |
| 4,547,547 | 10/1985 | Chen | 524/538 |
| 4,795,782 | 1/1989 | Lutz | 525/66 |
| 4,797,447 | 1/1989 | Gergen | 525/92 |
| 4,952,629 | 8/1990 | Liang | 525/66 |
| 4,981,896 | 1/1991 | Okada | 524/413 |
| 5,004,782 | 4/1991 | Mashita | 525/64 |
| 5,095,063 | 3/1992 | Okada | 525/64 |

OTHER PUBLICATIONS

Gelles et al., Proceedings of the SPE 46th Annual Technical Conference and Exhibits, pp. 513-515 (1988).
Plastics Technology, Feb. 1989, pp. 67-75.
Albee et al., Plastics Compounding, Sep./Oct. 1990, pp. 32-41.
Shell Chemical Co., Technical Bulletin SC:592-89.

*Primary Examiner*—Patricia A. Short
*Attorney, Agent, or Firm*—Foley & Lardner

[57] ABSTRACT

A thermoplastic blend of a polyalkylene terephthalate, polyolefin and a functionalized elastomer has improved impact strength while maintaining other needed properties including tensile strength, tensile elongation, and flexural modulus. Recycled polypropylene and PET plastics can be combined with a relative small amount of the functionalized elastomer to provide a blend useful for molding battery containers and other plastic structural members such as automotive components.

5 Claims, No Drawings

POLYESTER-POLYOLEFIN BLENDS CONTAINING A FUNCTIONALIZED ELASTOMER

FIELD OF THE INVENTION

This invention relates to a thermoplastic blend of a polyolefin, a polyester and an elastomer, particularly to a blend having improved impact strength.

BACKGROUND OF THE INVENTION

Polyolefins such as polypropylene (PP) have been used in many applications in the form of molded articles, film, sheets, etc., because these plastics are excellent in molding processability, toughness, moisture resistance, gasoline resistance, and chemical resistance, have a low specific gravity, and are inexpensive. However, polyolefins are poor or inadequate in heat resistance, stiffness, impact resistance, and scratch resistance. These deficiencies are obstacles to opening up new applications for polyolefins.

On the other hand, thermoplastic polyesters such as polyethylene terephthalate (PET) are widely used as engineering thermoplastics in the fields of automobile parts, electrical and electronic parts, because such polyesters have high heat resistance, stiffness, strength, scratch resistance, oil resistance, solvent resistance, and the like. It would, however, be desirable to further improve the molding processability, toughness, notched impact resistance, moisture resistance, and chemical resistance of these plastics. In addition, thermoplastic polyesters are disadvantageous in that these plastics have a higher specific gravity and are more expensive than polyolefins.

From such a view point, it would seem a useful approach to blend polyolefins and thermoplastic polyesters in order to obtain a thermoplastic resin having the characteristics of both of these resins for a particular application requiring aspects of each of these polymers. However, physical blending of these polymers have not been successful. Since polypropylenes and thermoplastic polyesters are naturally incompatible, mere mixing of these polymers involves problems. These immiscible plastics exhibit poor adhesion along blend interfaces, with resultant weakness. The mechanical properties, in particular, impact resistance, tensile elongation, and tensile strength of a molded product made of a mixture of polypropylene and thermoplastic polyester often have values lower than those expected by simple additivity or averaging of the physical properties of the polypropylene and thermoplastic polyester. The processability of a mixture of these polymers is limited to injection molding. The resulting products show extreme nonuniformity and ugly appearance owing to formation of flow marks, and cannot be used in practice in the manufacture of automobile parts or electric and electronic parts.

Conceptually, it should be possible to combine two dissimilar thermoplastics to obtain a blend that expresses the best properties of both polymers. A general example would be the blend of an amorphous polymer with a semi-crystalline polymer. In such a blend, the objective is to obtain the high heat and fatigue resistance of the amorphous polymer and the processability and solvent resistance of the semi-crystalline polymer.

In general, both interfacial agents and impact modifiers are required to produce multipolymer blends with a desirable balance of properties. Interfacial agents provide adhesion between the principal polymer phases, improving stress transfer, and are necessary to reduce interfacial tension during processing that can lead to gross phase separation. Thus, interfacial agents play an important role in determining the ultimate morphology of the blend.

Another objective is compatibilization and toughening of dissimilar plastic scraps produced in industrial or in recycling operations. Recycling operations, which have proliferated in recent years, are providing an abundant and inexpensive source for some thermoplastics. For instance, the recycling rate in the U.S. for plastic soft drink bottles made out of polyethylene terephthalate topped 31% in 1990. Recycled PET is particularly useful as an injection moldable material which can be formed into articles exhibiting a good balance of properties, including strength and stiffness. However, an improvement in impact strength and processability of these recycled PET materials is desirable.

Methods for improving impact strength of individual polymers include the use of hydrogenated block copolymers of styrene and butadiene, i.e., hydrogenated SBR rubbers, to enhance interfacial adhesion. These copolymers have a low glass transition and low modulus rubber phase which is required for impact modification. Hydrogenated SBR's also have little unsaturation, and can thus be blended with high processing temperature plastics without degradation.

Hydrogenated styrene-butadiene copolymers are unique compared to other rubbers in that these copolymers contain blocks which are microphase-separated over application and processing conditions. This microphase separation results in physical cross-linking, causing elasticity in the solid and molten states. Such an internal strength mechanism is often required to achieve toughness in plastic impact modification. The melt elasticity of the block copolymer during processing can, under the right conditions, enable it to be finely dispersed with another polymer in a stable, interpenetrating, co-continuous phase structure. In general, to significantly increase the impact strength of a thermoplastic, it is necessary to blend in an elastomer that forms finely-dispersed rubber particles within the plastic matrix. These rubber particles improve energy dissipation in the thermoplastic while simultaneously limiting the growth of cracks. To achieve the required morphology for effective toughening, the styrenic block copolymer should be compatible with the thermoplastic to be toughened.

While hydrogenated block copolymers of styrene and butadiene can improve the impact strength of polyolefins and polystyrene, such copolymers are less useful for modifying polymers dissimilar in structure to styrene or hydrogenated butadiene, such as polyesters and polyamides. However, impact modification using these copolymers can be further improved by grafting functional groups to the block copolymer which interact with the dissimilar material and enhance polymer blending. These interactions can include chemical bonding, e.g., cross-linking, hydrogen bonding and dipole-dipole interaction. A certain amount of residual unsaturation must be present in order to obtain an advantageous degree of functional moieties on the base copolymer.

Use of these techniques has been described in Chen U.S. Pat. No. 4,547,547, issued Oct. 15, 1985 to increase impact resistance and crystallization velocity of polyester blends by addition of a minor amount of a segmented polyesteramide. Lutz U.S. Pat. No. 4,795,782, issued Jan. 3, 1989 reports use of a functionalized elastomer and functionalized polyolefin to improve impact strength in a blend with a polyamide. Gergen U.S. Pat. No. 4,797,447, issued Jan. 10, 1989, describes use of a functionalized elastomer to improve impact strength of polyesters. Liang U.S. Pat. No. 4,952,629 issued Aug. 28, 1990, details use of functionalized elastomer to affect impact strength in a blend of polyester and polyesteramide.

Maleic anhydride has been proposed as a compatibilizing group for a variety of plastic blends; see *Plastics Technology*, February, 1989 pages 67-75 and Albee et al., *Plastics Compounding*, September/October 1990, pages 32-41. Kraton 1901X is a commercially available, maleic anhydride functionalized copolymer as described in Shell Chemical Co., *Technical Bulletin* SC:592-89. Compositions made from epoxy- and anhydride-modified polymers have also been proposed; see Okada U.S. Pat. No. 4,981,896 issued Jan. 1, 1991.

The performance of functionalized elastomers such as Kraton FG1901X in compatibilizing polymer blends has been mixed. Gelles et al., *Proceedings of the SPE 46th Annual Technical Conference and Exhibits*, pp. 513-515 (1988), used Kraton FG1901X in an attempt to compatibilize Nylon 6,6 with PPE, PP, and modified polypropylene. Non-functionalized Kraton G rubber was used as a comparison; see Table 3 at p. 514. Neither Kraton 1901X or G used at a 20% level provided any improvement in impact strength. Blends of nylon 6,6 with polypropylene and both rubber additives (40:40:10:10) produced some improvement. Overall, the authors concluded the nylon 6,6 was toughened by the Kraton 1901X rubber while the polyolefin and PPE phases are primarily toughened by the Kraton G (unmodified) rubber (at p. 514). Their experiments further showed that Kraton 1901X was effective to improve the impact strength of PET or PBT alone, but no mention was made of using Kraton 1901X in a polyolefin-PET or PBT blend, or what results might be expected with such a blend.

While impact strength in blends has undoubtedly been improved using functionalized elastomers, properties of the individual polymers in the blend have suffered. The present invention addresses this problem.

SUMMARY OF THE INVENTION

A thermoplastic blend according to the invention comprises a polyolefin, a polyester, and an elastomer having functional groups which interact with the polyolefin and polyester to form a plastic alloy having the best properties of both polymers, good processability, improved surface appearance of the molded parts, and especially increased impact strength. According to a preferred aspect of the invention, the polyester consists essentially of a polyalkylene terephthalate, the polyolefin consists essentially of polypropylene, and the elastomer is a styrenic rubber functionalized with highly polar functional groups, particularly maleic anhydride groups. Plastic alloys according to the invention have dramatically improved impact strength without loss of other important properties.

DETAILED DESCRIPTION

Polypropylene and PET are largely incompatible, and blends of these plastics generally display poorer properties than either of the component polymers. In particular, there is a loss of both tensile and impact strength, and a large increase in brittleness reflected by reduced tensile elongation percentages; see Table 2 below. Surprisingly, it has been found according to the present invention that, within certain prescribed ranges, blending polypropylene, PET and a functionalized elastomer produces a blend having greater impact strength than either of the parent materials (polypropylene and PET) while maintaining other properties at levels sufficiently high to provide a blend useful for fabricating battery cases, automotive body components such as bumpers, and other structural members. Use of an elastomer as an impact modifier to improve impact strength often leads to a large loss in stiffness, i.e., a large drop in flexural modulus as would be expected as the blend becomes more rubbery.

Blends according to the invention have a unique combination of high softening point, high impact strength, high tensile strength, good ductility (tensile elongation) and good stiffness (high flexural modulus). This can be attributed to a phase homogenization which occurs as the amount of functionalized elastomer in the blend increases. In a series of blends wherein the amount of functionalized elastomer was 0, 5, 10, and 15 wt. % in each respective polypropylene and PET composition, a progressive improvement was observed in the morphology of the blend for a 25% PET:75% PP blend.

With no functionalized elastomer, the blend showed two discrete phases, a continuous PP matrix and a second (PET) phase being evident as small round beads. This second phase progressively faded at 5-10% levels of functionalized elastomer, and disappeared entirely at 15% to form a homogenous blend. This enhancement in morphology coincided with a sudden increase in impact strength, as show below in the experimental examples.

Polyesters used in blends according to the invention are preferably polyalkylene terephthalates, particularly polyethylene terephthalates, polypropylene terephthalates and polybutylene terephthalates, and mixtures or copolymers thereof, of the grades commonly used to mold useful plastic articles. Preferred polyesters have a generally crystalline structure and a molecular weight of at least about 10,000, a melting point over about 120° C., an intrinsic viscosity (IV) of at least 0.4 dl/per gram as measured in 60:40 phenol/tetrachloroethane mixture at 30° C. in a concentration of 0.5% by weight. Especially suitable polyalkylene terephthalates have a tensile strength of at least at least 9,000 psi, a tensile elongation of at least 500%, a flexural modulus of not more than about 350,000 psi at 23° C., and an Izod impact strength of at least about 1.0 ft-lbs/in. A variety of polyalkylene terephthalates having a wide range of properties are available commercially.

The preferred polyolefin for blending with the polyalkylene terephthalate is polypropylene, although other polyalkylenes such as low or high density polyethylene, polybutene-1, polybutylene, and mixtures or copolymers thereof, could also be employed. Polyethylene has lower heat resistance, strength and stiffness than polypropylene and would accordingly be less useful for applications requiring such strength, as described hereafter. Blends of about 70-100 wt. % polypropylene having a molecular weight above 10,000, preferably above 50,000, with 0-30 wt. % polyethylene or polybutylene of similar or lower molecular weight are most preferred. Especially suitable polyolefins have a tensile strength of at least about 6,000 psi, a tensile elongation of at least 1000%, a flexural modulus of not more than about 125,000 psi at 23° C., an izod impact strength of at least about 2.0 ft-lbs/in, and a heat seal strength of at least about 1200 psi. Polyolefins having a wide range of properties are available commercially.

The third component of the blend is a functionalized elastomer capable of compatibilizing the polyalkylene terephthalate and the polyolefin, while at the same time acting as an impact-modifier. A preferred functionalized elastomer according to the invention is a functionalized styrene rubber, for example, a block copolymer containing styrene units and alkylene units, such as ethylene, propylene or butylene. Examples include functionalized styrene-butadiene, styrene-isoprene, styrene-ethylene/propylene, and styrene-ethylene/butylene copolymers. One such copolymer is Kraton FG 1901X from Shell Oil Company of Houston, Texas, a maleic anhydride functionalized triblock copolymer consisting of polystyrene endblocks and poly(ethylene/butylene) midblocks.

The polar functional groups of the elastomer enhance the interaction of the polymer with polar materials such as PET. The polar functional group is preferably a carboxylic acid, anhydride, or ester group, as contrasted with an acrylate group, which is essentially non-polar. In the case of an anhydride group, the functionalized elastomer has succinic anhydride radicals bonded therein. The functional groups are present in an amount effective to improve compatibility of the blend, most commonly from about 1 to 5 wt. % based on the weight of the functionalized elastomer as a whole. An insufficient amount of the polar functional group fails to achieve compatibilization, whereas an excessive amount renders the mixture too difficult to form. The polar functional groups are incorporated as side groups on the backbone chain. These groups interact with the dissimilar materials and enhance polymer blending. These interactions can include chemical reaction, hydrogen bonding, and dipole-dipole interactions.

Preferred blends according to the invention consist essentially of (A) 50 to 95 wt. %, particularly 70 to 90 wt. %, of a blend of the polyalkylene terephthalate, preferably polyethylene terephthalate, and polypropylene, with a weight ratio of polypropylene to polyethylene terephthalate in the range of 19:1 to 1:19, preferably 9:1 to 1:9 and especially 4:1 to 1:4, with (B) 5 to 50 wt. %, particularly 10 to 30 wt. %, especially 15 to 20 wt. % of an elastomer, preferably a styrene-ethylene-butylene block copolymer, having polar functional groups which interact with the polyalkylene terephthalate and polypropylene to form a plastic alloy having increased impact strength. Preferred polar groups are carboxylic acid, anhydride or ester groups.

Various additives or impurities may be present in the composition of the invention to enhance a specific property, or may be present as a result of recycling. Fire retardants, antioxidants, plasticizers, and pigments are commonly found in polyalkylene terephthalate. Other additions include stabilizers and inhibitors of oxidative, thermal, and ultraviolet light degradation, lubricants and mold release agents, nucleating agents, reinforcements, fillers, etc. Surprisingly, however, the addition of a non-functionalized elastomer in amounts of about 5 wt. % or above of component (A) appears to interfere with compatibilization, as demonstrated by the experimental results set forth in Table 6 below. Accordingly, the blends according to the invention preferably contain less than 5 wt. % of non-functionalized elastomers or other fillers, and are preferably free of such additives.

Blends according to the invention may be prepared by conventional blending techniques, such as those described in Chen et al. U.S. Pat. No. 4,547,547, the entire contents of which are incorporated by reference herein. The solid components may be combined and dry-blended using a barrel or tumble mixer. The components are combined and processed in a melt extruder, creating strands and other forms which are then pelletized for injection or blow molding. This can be accomplished by techniques well known in the art.

Plastic alloys according to the invention have improved impact strength while maintaining high flex modulus, tensile and heat seal strength, and higher softening or heat distortion temperatures than are possible with polypropylene alone. The blend has an impact strength of at least about 3 foot-lbs per sq. inch, a tensile strength of not less than about 5,000 psi, a flexural modulus of at least 120,000 psi, and a heat deflection temperature of not less than about 195° F.

The invention permits new uses for PET scrap. PET incorporated in blends according to the invention may be used in automotive applications as a replacement for previous polypropylene, PBT, and virgin PET products. In particular, blends of the invention can be used to fabricate structural members or panels such as bumpers, fenders, cowl vent leaf catchers, battery trays, battery cases, fan shrouds, engine splash shields, heater/AC housings, fuel tank guards, steering column housings, mirror backing plates, brake vacuum pump housings, distributor caps, and fuel pump housings, among others. Klebenow et. al. U.S. Pat. No. 5,002,840, issued Mar. 26, 1991, the contents of which are incorporated by reference herein, illustrates a representative battery case for a dual battery. The properties of the specific composition can be adjusted for intended applications by varying the relative amounts of each of the three main components.

The cost benefits and environmental advantages of using recycled materials are obvious. The starting materials need not have high purity; plastics recycled from polypropylene battery casings and PET soda containers are ideal. Blends of the invention can be blow molded as well as injection molded, offering production advantages.

In battery container applications, the blends of the invention provide significant improvements in container properties. Container heat seal and impact failures are the major sources of field returns of standard 12 volt automotive batteries. Polypropylene is the current material of choice for battery containers. Attempts to improve polypropylene impact strength have resulted in an unacceptable lowering of flex modulus. The blends of the invention provide improved resistance to explosion during an accidental explosion of combustible gases within the battery while maintaining other needed properties. Impact strength and heat seal strength are essential properties for battery containers.

EXAMPLE 1

Polymer blends in accordance with the invention were prepared from commercially available polyethylene terephthalate (Kodak 9663), polypropylene (Himont SB-786), and compatibilizer (Shell Kraton G1901X) using the formulations given in Table 1.

TABLE 1

| Blend | PET:PP (Ratio) | Shell Kraton G1901X (%) | Kodak 9663 PET (grams) | Himont SB-786 PP (grams) | Shell Kraton G1901X (grams) |
|---|---|---|---|---|---|
| A | 20:80 | 0 | 454 | 1,814 | 0 |
| B | 40:60 | 0 | 907 | 1,361 | 0 |
| C | 60:40 | 0 | 1,361 | 907 | 0 |
| D | 80:20 | 0 | 1,814 | 454 | 0 |
| E | 20:80 | 15 | 386 | 1,542 | 340 |
| F | 40:60 | 15 | 771 | 1,157 | 340 |
| G | 60:40 | 15 | 1,157 | 771 | 340 |
| H | 80:20 | 15 | 1,542 | 386 | 340 |
| I | 20:80 | 5 | 431 | 1,724 | 113 |
| J | 40:60 | 5 | 862 | 1,293 | 113 |
| K | 60:40 | 5 | 1,293 | 862 | 113 |
| L | 80:20 | 5 | 1,724 | 431 | 113 |
| M | 20:80 | 10 | 408 | 1,633 | 227 |
| N | 40:60 | 10 | 816 | 1,225 | 227 |
| O | 60:40 | 10 | 1,225 | 816 | 227 |
| P | 80:20 | 10 | 1,633 | 408 | 227 |
| Q | 20:80 | 20 | 363 | 1,452 | 454 |
| R | 40:60 | 20 | 726 | 1,089 | 454 |
| S | 60:40 | 20 | 1,089 | 726 | 454 |
| T | 80:20 | 20 | 1,452 | 363 | 454 |
| U | 0:100 | 0 | 0 | 2,268 | 0 |
| V | 100:0 | 0 | 2,268 | 0 | 0 |

The blends were prepared by dry mixing the components in pulverized form using a Patterson Portashell mixer. The resulting mixture was melt blended by a Berlyn 1" single screw extruder operated at 50 RPM and 4–5 amps, then run through a 36" cold water bath, an air knife to remove water, and finally into a pelletizer. All mixtures were dried for one hour in a 150° C. oven prior to extrusion. The temperature setting in the first pelletizer zone was 540° C., 510° C. in the second zone, and 485° C. in the third zone, with a die temperature of 450° C. Dry argon was used in the hopper to control humidity. The compounds were injection molded into test bars and subjected to tensile and impact tests (see Table 2), and melt flow tests.

Melt flow tests were conducted at temperatures of 250°–255° C. and a load of 2.16 kg in accordance with ASTM D1238. Polypropylene alone had a flow rate of 10.57 grams/10 min.; PET alone has a flow rate of only 0.65 g/10 min. at 250° C. For the blends containing 20–80% PET, 80–20% polypropylene and 5–20% functionalized elastomer, flow rates varied from about 6 to 30 g/10 min., indicating good flow characteristics.

In Table 2, column 1 identifies the relative amounts by weight of polypropylene and PET in the mixture, col. 2 identifies the sample by letter, col. 3 gives the amount in wt. % of functionalized elastomer (FE) added based on the combined weight of polypropylene and PET, col. 4 gives the tensile strength (TS) in psi in accordance with ASTM D638-87b, col. 5 gives tensile elongation (TE) in percent, also per ASTM D638-87b, col. 6 gives flex modulus in psi as determined by ASTM D790-86, col. 7 gives Izod impact strength in ft-lb/in as determined by ASTM D256-87, and col. 8 gives battery container tensile heat seal strength (HS) in psi tested from the sample heat-sealed in T sections and determined in accordance with ASTM D638-87b. NB=no break during the impact test, i.e., an impact strength of 15 foot/lbs per inch or greater.

TABLE 2

| 1 | 2 | FE 3 | TS 4 | TE 5 | FM 6 | IS 7 | HS 8 |
|---|---|---|---|---|---|---|---|
| PP | U | 0 | 6,053 | 1,005 | 122,338 | 2.2 | 1,200 |
| PET- | A | 0 | 5,392 | 846 | 165,255 | 0.8 | |
| PP | I | 5 | 5,770 | 940 | 134,327 | 1.7 | |
| 20:8 | M | 10 | 5,576 | 995 | 109,797 | 3.2 | |
| 0 | E | 15 | 5,327 | 1,006 | 91,120 | NB | |
|  | Q | 20 | 5,227 | 1,039 | 81,135 | NB | |
| PET: | B | 0 | 4,854 | 101 | 196,951 | 0.9 | 533 |
| PP | J | 5 | 5,280 | 640 | 154,907 | 1.4 | 1,254 |
| 40:6 | N | 10 | 5,931 | 770 | 126,667 | 3.8 | 1,673 |
| 0 | F | 15 | 5,404 | 700 | 103,509 | NB | 1,718 |
|  | R | 20 | 6,092 | 897 | 84,945 | NB | 1,663 |
| PET: | C | 0 | 5,777 | 14 | 232,326 | 1.5 | 470 |
| PP | K | 5 | 5,350 | 452 | 184,966 | 1.8 | 987 |
| 60:4 | O | 10 | 6,009 | 575 | 164,834 | 2.6 | 813 |
| 0 | G | 15 | 5,315 | 504 | 134,089 | NB | 1,174 |
|  | S | 20 | 5,758 | 600 | 118,774 | NB | 1,072 |
| PET: | D | 0 | 6,807 | 79 | 269,339 | 1.0 | |
| PP | L | 5 | 6,540 | 490 | 220,114 | 1.6 | |
| 80:2 | P | 10 | 6,299 | 434 | 201,750 | 2.0 | |
| 0 | H | 15 | 6,303 | 559 | 186,983 | NB | |
|  | T | 20 | 5,743 | 520 | 169,422 | NB | |
| PET | V | 0 | 9,164 | 517 | 327,464 | 1.0 | |

The results show that compositions containing from 40:60 to 60:40 PP:PET with 10–15 wt. % functionalized elastomer have particularly improved impact strength while maintaining other desired properties. In particular, at 40–60% polypropylene and 60–40% PET blend compositions having 10% or more compatibilizer, tensile strength, flex modulus, and heat seal strength equaled or exceeded the properties of polypropylene alone, while tensile elongation and heat seal strength exceeded levels possible with PET alone. Melt flow rates were likewise improved over the corresponding levels for polypropylene and PET.

EXAMPLE 2

Polymer blends according to the invention were prepared according to the procedure of Example 1 from commercially available polyethylene terephthalate (Kodak 9663), polypropylene (Himont EBM grade), and functionalized elastomer (Shell Kraton G1901X). Test bars were prepared as in Example 1 and tested for tensile strength, elongation, impact properties. The results are set forth in Tables 3 and 4.

TABLE 3

| Composition | Kraton FG1901X (%) | Tensile Strength (psi) | Tensile Elong. (%) | Flex Modulus (psi) |
|---|---|---|---|---|
| PP | 0 | 6,053 | 1,005 | 122,338 |
| PET-PP 50:50 | 0.0 | 5,330 | 26 | 172,718 |
|  | 7.5 | 4,707 | 381 | 139,902 |
|  | 10.0 | 5,689 | 533 | 136,785 |
|  | 12.5 | 6,542 | 670 | 124,872 |
|  | 15.0 | 6,457 | 652 | 119,976 |
| PET | 0 | 9,164 | 517 | 327,464 |

TABLE 4

| Composition | Kraton FG1901X (%) | Impact Strength (ft-lbs/in) at: | | | |
|---|---|---|---|---|---|
|  |  | 23° C. | 0° C. | −20° C. | −40° C. |
| PP | 0 | 2.20 | | | |
| PET-PP 50:50 | 0.0 | 0.57 | 0.43 | 0.56 | 0.42 |
|  | 7.5 | 1.66 | 1.22 | 0.85 | 0.64 |
|  | 10.0 | 2.25 | 1.44 | 1.03 | 0.67 |
|  | 12.5 | 2.31 | 1.70 | 1.20 | 0.68 |
|  | 15.0 | NB | 2.54 | 1.80 | 0.79 |
| PET | 0 | 1.00 | | | |

Table 4 demonstrates that the improved impact strength of the plastic blends according to the invention persists even at low temperatures, particularly when the amount of the functionalized elastomer is at least 15 wt. %.

EXAMPLE 3

The procedure of Example 1 was repeated using a variety of different blend formulations. The base blend (polypropylene-PET) was a 50:50 PP:PET blend containing one or more of the functionalized elastomer (FE, Kraton 1901X), a non-functionalized elastomer impact modifier (Kraton G rubbers Kraton 1701M or Kraton 1652M) or chopped glass fibers as a filler.

TABLE 5

| Sample | Composition |
|---|---|
| 1 | 10 parts FE, 5 parts IM (1701M) in base blend |
| 2 | 5 parts FE, 10 parts IM (1701M) in base blend |
| 3 | 10 parts FE, 5 parts IM (1652M) in base blend |
| 4 | 5 parts FE, 10 parts IM (1652M) in base blend |
| 5 | 5 parts FE, 5 parts IM (1701M), 5 parts IM (1652M) in base blend |
| 6 | 15 parts IM (1701M) in base blend |
| 7 | 15 parts IM (1652M) in base blend |
| 8 | 100 parts FE in base blend |
| 9 | 1000 parts FE in base blend |
| 10 | 5 parts FE in PET |
| 11 | 10 parts FE in PET |
| 12 | 15 parts FE in PET |
| 13 | 20 parts FE in PET |
| 14 | 30 parts FE in PET |
| 15 | 20 parts IM (1701M) in base blend |
| 16 | 20 parts IM (1652M) in base blend |
| 17 | 15 parts FE, in polypropylene |
| 18 | 15 parts FE, 23 parts chopped glass fiber strands, in base blend |

In each case, the number of parts represents parts by weight relative to 100 parts by weight of the polypropylene, PET or base blend. The results are set forth in Table 6, wherein the "SD" columns indicate one standard deviation for the measured values.

TABLE 6

| Material | Flex. Modulus (psi) | SD (psi) | Impact Strength (ft-lb/in) | SD (ft-lb/in) |
|---|---|---|---|---|
| 1 | 144,983 | 3,302 | 1.79 | 0.13 |
| 2 | 153,931 | 2,273 | 1.60 | 0 |
| 3 | 144,631 | 2,387 | 1.79 | 0.13 |
| 4 | 153,113 | 1,662 | 1.82 | 0.21 |
| 5 | 157,645 | 2,565 | 1.66 | 0.09 |
| 6 | 169,094 | 3,530 | 1.60 | 0 |
| 7 | 144,360 | 1,943 | 1.60 | 0 |
| 8 | 67,220 | 4,208 | 8.83 | 1.13 |
| 10 | 309,407 | 2,329 | 1.06 | 0.14 |
| 11 | 298,156 | 1,069 | 1.79 | 0.18 |
| 12 | 279,837 | 1,672 | 2.18 | 0.24 |
| 13 | 275,362 | 8,736 | 2.05 | 0.70 |
| 14 | 224,839 | 3,918 | 12.42 | 1.13 |
| 15 | 137,294 | 2,338 | 1.73 | 0.18 |
| 16 | 138,787 | 693 | 1.76 | 0 |
| 17 | 97,910 | 2,096 | 12.56 | 0.45 |
| 18 | 288,561 | 7,018 | 1.22 | 0.09 |

The results illustrate the unpredictable nature of these blends. For Samples 1-7, replacing as little as 5 of 15 parts of the functionalized elastomer with a like amount of a similar but non-functionalized elastomer completely negated the improved impact strength effect. In fact, the results for Samples 1-7 were no better than the results for Samples 15 and 16, where the functionalized elastomer was completely replaced with non-functionalized elastomer.

Where the amount of functionalized elastomer is increased to 50% (Sample 8), the flexural modulus becomes too low (the mixture becomes too rubbery for structural applications.) At 91% (Sample 9) functionalized elastomer, the blend is unusable.

Samples 10-14 show that the functionalized elastomer is effective to improve the impact strength of PET alone, but at a much higher level (30 parts) than with the blends, and with a reduction of tensile strength and elongation below acceptable levels; the blend becomes more brittle than either polypropylene or PET. Sample 17 shows that the same thing happens when the functionalized elastomer is used with polypropylene alone.

The foregoing results indicate that the improvement in overall properties, i.e., improved impact strength without loss of other needed properties, occurs only when the two basic component plastics are used in combination with effective amounts of the functionalized elastomer. Large amounts of additives such as ordinary elastomers (Samples 1-7) or glass fiber filler (Sample 18) interfere with the synergistic interaction between the three essential components of the blend, causing a drastic loss in the desired properties.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains and falling within the scope of the invention or the limits of the appended claims.

We claim:

1. A thermoplastic blend, consisting essentially of:
    80 to 85 wt. % of (A) polyethylene terephthalate and polypropylene, wherein the weight ratio of polypropylene to polyethylene terephthalate is in the range of about 40:60 to 60:40; and
    15 to 20 wt. % of (B) a styrene-ethylene/butylene copolymer functionalized with from about 1 to 5 wt. % of anhydride groups which interact with the polyethylene terephthalate and polypropylene to form a plastic alloy having increased impact strength.

2. The blend of claim 1, wherein said blend has an impact strength of at least about 3 foot-lbs per sq. inch, a tensile strength of not less than about 5,000 psi, a flexural modulus of at least 80,000 psi, and a heat deflection temperature of not less than about 195° F.

3. The blend of claim 2, wherein said blend has an impact strength of at least about 15 foot-lbs per sq. inch, a tensile strength of not less than about 5,000 psi, a flexural modulus of at least 120,000 psi.

4. A battery container made of the blend of claim 1.

5. An automotive body structural member made of the blend of claim 1.

* * * * *